(12) United States Patent
Akaishi et al.

(10) Patent No.: US 11,508,997 B2
(45) Date of Patent: Nov. 22, 2022

(54) BATTERY CONTROL DEVICE AND ABNORMALITY SENSING METHOD

(71) Applicant: TOYOTA JIDOSHA KABUSHIKI KAISHA, Toyota (JP)

(72) Inventors: Takayuki Akaishi, Toyota (JP); Sunao Horitake, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 107 days.

(21) Appl. No.: 16/931,067

(22) Filed: Jul. 16, 2020

(65) Prior Publication Data

US 2021/0135298 A1 May 6, 2021

(30) Foreign Application Priority Data

Nov. 1, 2019 (JP) .............................. JP2019-200067

(51) Int. Cl.
*H01M 10/44* (2006.01)
*H01M 10/42* (2006.01)

(52) U.S. Cl.
CPC ..... *H01M 10/441* (2013.01); *H01M 10/4207* (2013.01); *H01M 2220/20* (2013.01)

(58) Field of Classification Search
CPC ........... H01M 10/4207; H01M 10/425; H01M 10/441; H01M 10/482; H01M 2010/4271; H01M 2220/20; Y02E 60/10
See application file for complete search history.

(56) References Cited

U.S. PATENT DOCUMENTS

2004/0001996 A1* 1/2004 Sugimoto ........ G01R 19/16542
429/61
2004/0155629 A1 8/2004 Kobayashi et al.

FOREIGN PATENT DOCUMENTS

| JP | 2003-282156 A | 10/2003 |
| JP | 2004-031120 A | 1/2004 |
| JP | 2004-266992 A | 9/2004 |
| JP | 2015-033283 A | 2/2015 |
| JP | 2016-217900 A | 12/2016 |
| JP | 2018-073693 A | 5/2018 |

* cited by examiner

*Primary Examiner* — Victoria H Lynch
(74) *Attorney, Agent, or Firm* — Oliff PLC

(57) ABSTRACT

A battery control device, which controls a battery, including cell blocks connected in series in which battery cells are connected in parallel, to execute voltage equalization of the cell blocks, includes a detection unit that detects voltage between positive and negative electrodes of each cell block, a voltage equalization circuit that includes a plurality of discharge units in which at least one discharge element and a switching element are connected in series, and a control unit that controls the switching elements to equalize the voltages of the cell blocks. The discharge units are connected between the positive and negative electrodes of the cell blocks, respectively. The control unit controls the switching elements at a predetermined timing to execute discharge of the cell blocks, and determines whether there is an abnormality in the cell blocks based on voltage differences between the cell blocks before and after the discharge.

6 Claims, 5 Drawing Sheets

BATTERY CONTROL DEVICE AND ABNORMALITY SENSING METHOD

CROSS-REFERENCE TO RELATED APPLICATION

This application claims priority to Japanese Patent Application No. 2019-200067 filed on Nov. 1, 2019, incorporated herein by reference in its entirety.

BACKGROUND

1. Technical Field

The present disclosure relates to a battery control device configured to control a battery including two or more cell blocks connected in series, in each of which a plurality of battery cells is connected in parallel, and an abnormality sensing method for cell blocks, which is executed by the battery control device.

2. Description of Related Art

Japanese Unexamined Patent Application Publication No. 2016-217900 (JP 2016-217900 A) discloses a device that senses an abnormality occurring in a high-voltage battery for driving an electric vehicle. In JP 2016-217900 A, an abnormality in the battery is efficiently sensed by determining a voltage difference before and after charge when the charge is executed with a large width of change from a state of low charge (low SOC) to a state of high charge (high SOC).

SUMMARY

For realization of abnormality sensing in the cell blocks described in JP 2016-217900 A, a dedicated device with an abnormality sensing function for the cell blocks is separately required, and thus, the cost of the battery control device is increased.

The present disclosure has been made in consideration of the above shortcoming, and is aimed at providing a battery control device and an abnormality sensing method that can restrict an increase in the cost of a battery control device due to an addition of an abnormality sensing function for cell blocks.

For solving the above shortcoming, one aspect of the present disclosure is a battery control device that controls a battery, including two or more cell blocks connected in series in each of which a plurality of battery cells is connected in parallel, to execute equalization of a voltage of each cell block. The battery control device includes a detection unit configured to detect the voltage between a positive electrode and a negative electrode of each cell block, a voltage equalization circuit that includes, corresponding to the cell blocks, a plurality of discharge units in each of which at least one discharge element and a switching element are connected in series, and a control unit configured to control switching elements in the plurality of discharge units to equalize the voltage of each cell block. The discharge units are connected between the positive electrodes and the negative electrodes of the cell blocks, respectively. The control unit is configured to control the switching elements at a predetermined timing to execute discharge of each cell block for a first time, and determine whether there is an abnormality in the cell blocks based on a voltage difference of each cell block before and after the discharge.

Further, another aspect of the present disclosure is an abnormality sensing method for a cell block, which controls a battery, including two or more cell blocks connected in series in each of which a plurality of battery cells is connected in parallel, and is executed by a battery control device. The battery control device includes a detection unit configured to detect a voltage between a positive electrode and a negative electrode of each cell block, and a voltage equalization circuit that includes, corresponding to the cell blocks, a plurality of discharge units in each of which at least one discharge element and a switching element are connected in series. The discharge units are connected between the positive electrodes and the negative electrodes of the cell blocks, respectively. The abnormality sensing method includes a step of controlling the switching elements at a predetermined timing to execute discharge of each cell block for a first time, a step of calculating a voltage difference of each cell block before and after the discharge, and a step of determining whether there is an abnormality in the cell blocks based on the calculated voltage difference.

With a battery control device and an abnormality sensing method of the present disclosure, since it is possible to determine whether there is an abnormality in cell blocks using a voltage equalization circuit provided in a battery, an increase in the cost of a battery control device due to an addition of a cell block abnormality sensing function can be restricted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A battery control device and an abnormality sensing method of the present disclosure determine whether there is an abnormality in a plurality of cell blocks connected in series using a voltage equalization circuit provided in advance in the battery to be controlled. As such, an increase in the cost of a battery control device due to an addition of a cell block abnormality sensing function can be restricted.

Embodiment

Hereinafter, an embodiment of the present disclosure will be described in detail with reference to the drawings.

Configuration

Figure 1:
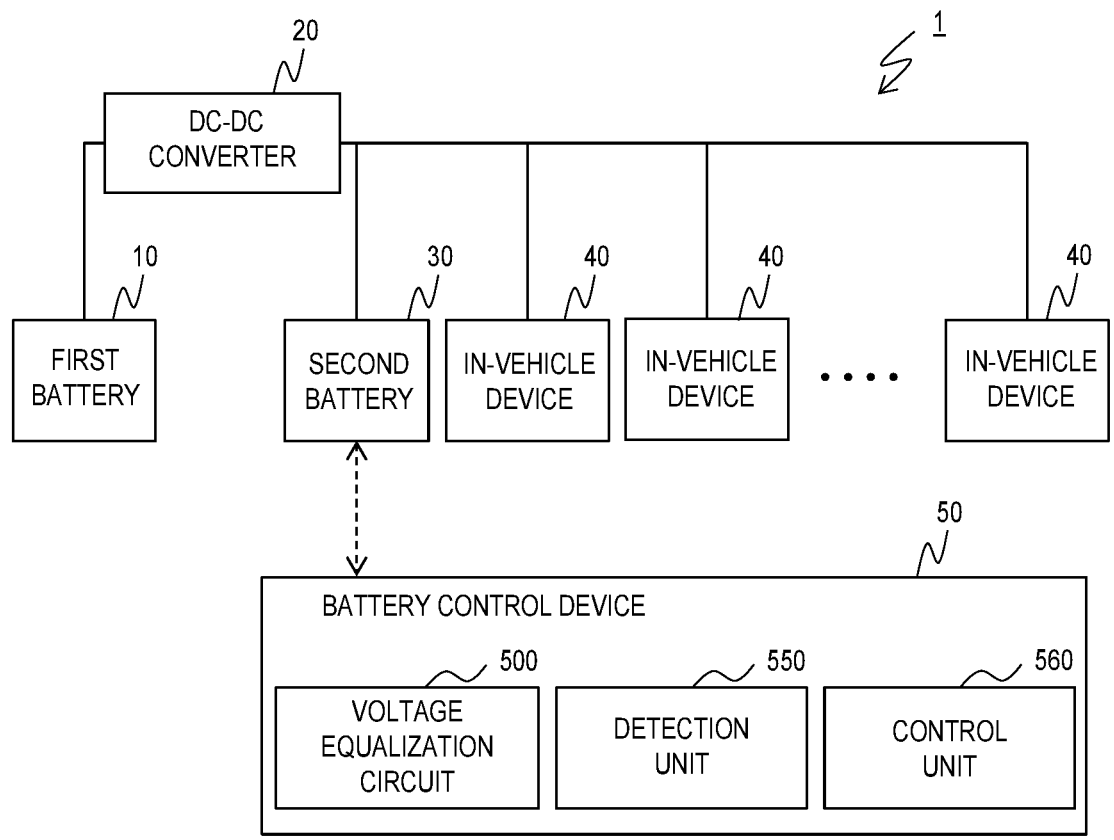
FIG. 1 is a block diagram illustrating a schematic configuration of a power supply system including a battery control device according to an embodiment of the present disclosure.

FIG. 1 is a block diagram illustrating a schematic configuration of a power supply system including a battery control device according to an embodiment of the present disclosure. The power supply system 1 illustrated in FIG. 1 includes a first battery 10, a DC-DC converter 20, a second battery 30, a plurality of in-vehicle devices 40, and a battery control device 50 according to the present embodiment.

The power supply system 1 illustrated in FIG. 1 can be mounted on a vehicle. In the following embodiment, control of the battery control device 50 according to the present embodiment will be described by exemplifying a case where the power supply system 1 is mounted on a vehicle using, as a power source, an electric motor, such as a hybrid vehicle (HV), a plug-in hybrid vehicle (PHV), and an electric vehicle (EV).

The first battery 10 is a high-voltage battery that supplies power to an electric motor (not shown) or the DC-DC converter 20. Further, the first battery 10 may be configured to obtain power from an external power source through a plug-in charger (not shown) connectable to the external power source. As the first battery 10, a secondary battery, such as a lithium ion battery configured to be chargeable and dischargeable, is used.

The DC-DC converter 20 connects the first battery 10 to the second battery 30 and the in-vehicle devices 40, and supplies the power from the first battery 10 to the second battery 30 and the in-vehicle devices 40. When power is supplied, the DC-DC converter 20 can convert the high-voltage of the first battery 10, which is an input voltage, into a predetermined low-voltage, and output the predetermined low-voltage.

Figure 2:
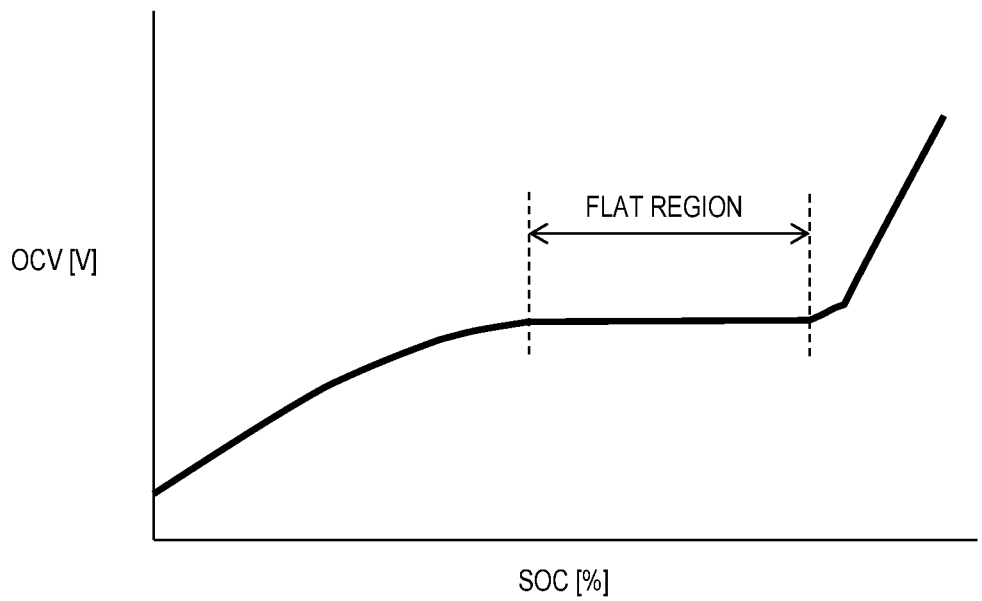
FIG. 2 is a diagram illustrating one example of a state-of-charge versus open-circuit-voltage (SOC-OCV) characteristic curve of a lithium iron phosphate battery.

The second battery 30 is a low-voltage battery that charges power output from the DC-DC converter 20 and discharges its own power. A typical second battery 30 mounted on the vehicle is an auxiliary battery. As the second battery 30, a battery having a region (a flat region), in which an absolute value of a change rate of an open circuit voltage (OCV) with respect to a state of charge (SOC) is equal to or smaller than a second value, in an SOC-OCV characteristic curve indicating a relationship between the SOC of the battery and the OCV is used. The second value is a predetermined value based on a specification of the battery. An example of the battery having the flat region can be a lithium iron phosphate battery (an LFP battery). FIG. 2 illustrates an example of the SOC-OCV characteristic curve of a lithium iron phosphate battery.

Figure 3:
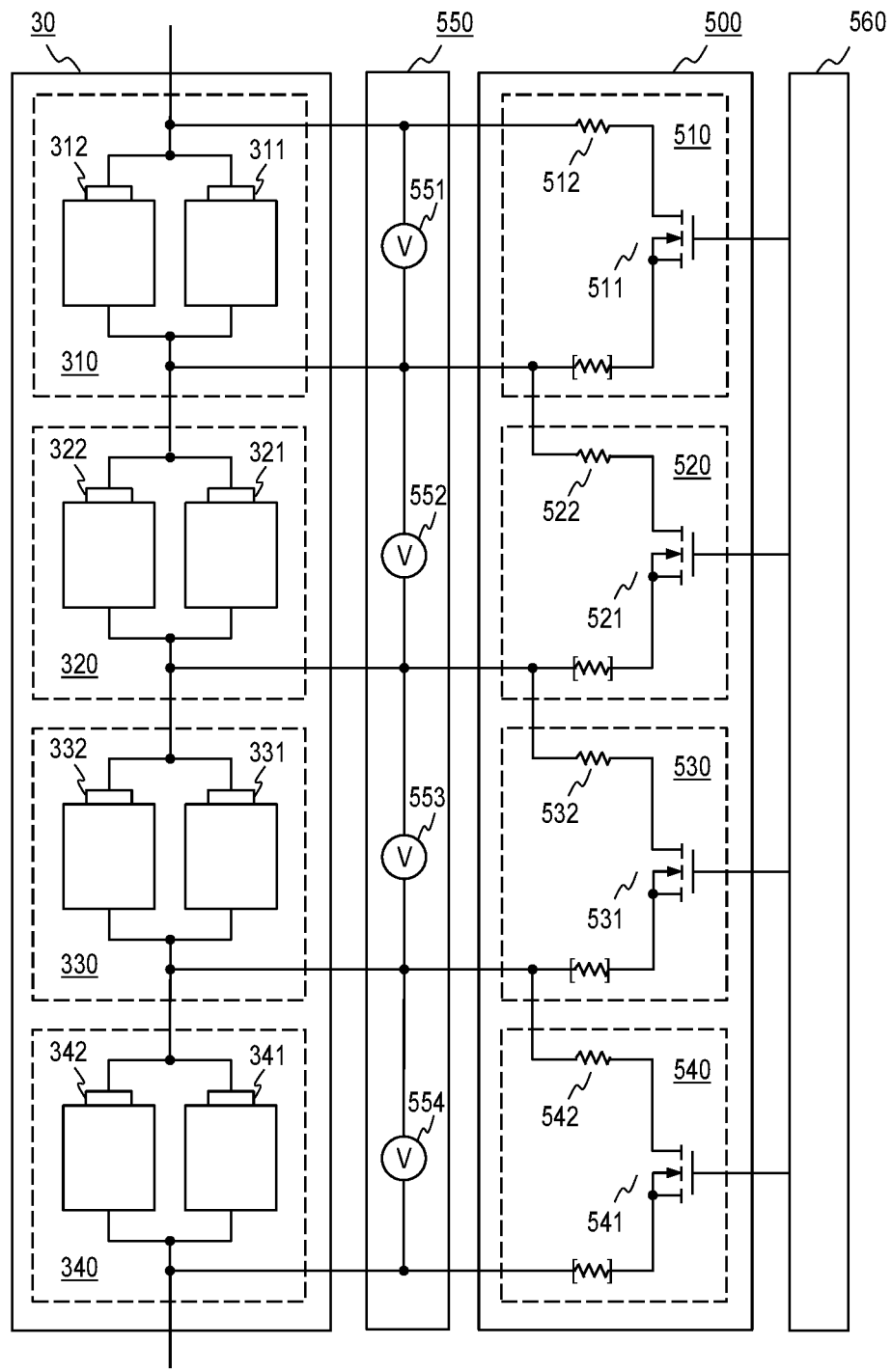
FIG. 3 is a diagram illustrating a configuration example of a second battery.

The second battery 30 includes two or more cell blocks connected in series in which a plurality of battery cells is connected in parallel. FIG. 3 illustrates a configuration example of the second battery 30. The second battery 30 illustrated in FIG. 3 includes the cell blocks connected in series in order of a first cell block 310 in which battery cells 311, 312 are connected in parallel, a second cell block 320 in which battery cells 321, 322 are connected in parallel, a third cell block 330 in which battery cells 331, 332 are connected in parallel, and a fourth cell block 340 in which battery cells 341, 342 are connected in parallel. A configuration of the second battery 30 is not limited to that illustrated in FIG. 3, and may include three or more battery cells connected in parallel or two, three, five, or more cell blocks connected in series depending on a power demand of the in-vehicle devices 40.

The in-vehicle devices 40 are various in-vehicle devices that operate with the power output from the DC-DC converter 20 or the power from the second battery 30. Examples of the in-vehicle devices 40 include an actuator, such as a motor and a solenoid, a light, such as a headlamp and an indoor light, an air-conditioner, such as a heater and a cooler, steering, and a brake, and an electronic control unit (ECU) for autonomous driving or advanced driving assistance.

The battery control device 50 includes a voltage equalization circuit 500, a detection unit 550, and a control unit 560, and controls the second battery 30.

The voltage equalization circuit 500 executes a processing of equalizing variations in the voltages (that is, SOC) occurring between the respective cell blocks of the second battery 30 based on an instruction of the control unit 560. The variation in the voltage between the cell blocks is caused by a variation in an amount of self-discharge of each battery cell. When the voltages vary between the cell blocks, deterioration of a specific battery cell progresses at an accelerated rate and an amount of available energy decreases. Therefore, these effects are avoided by discharging the cell block having a high voltage, if needed, to reduce the voltage and aligning the voltage with the voltages of the other cell blocks, using the voltage equalization circuit 500.

The voltage equalization circuit 500 is composed of a plurality of discharge units corresponding to a plurality of cell blocks of the second battery 30. FIG. 3 illustrates a configuration example of the voltage equalization circuit 500. As illustrated in FIG. 3, the voltage equalization circuit 500 is composed of a first discharge unit 510 connected between positive and negative electrodes of the first cell block 310 of the second battery 30, a second discharge unit 520 connected between the positive and negative electrodes of the second cell block 320 of the second battery 30, a third discharge unit 530 connected between the positive and negative electrodes of the third cell block 330 of the second battery 30, and a fourth discharge unit 540 connected between the positive and negative electrodes of the fourth cell block 340 of the second battery 30.

The first discharge unit 510 has a configuration in which a discharge element 512, such as a resistor, and a switching element 511, such as a transistor, are connected in series, and a discharge path from the positive electrode to the negative electrode of the first cell block 310 can be formed by an operation (on) of the switching element 511. The discharge element 512 may be inserted in either the source side or the drain side of the switching element 511, or may be connected to both sides. The second discharge unit 520 has a configuration in which a discharge element 522, such as a resistor, and a switching element 521, such as a transistor, are connected in series, and a discharge path from the positive electrode to the negative electrode of the second cell block 320 can be formed by an operation (on) of the switching element 521. The discharge element 522 may be inserted in either the source side or the drain side of the switching element 521, or may be connected to both sides. The third discharge unit 530 has a configuration in which a discharge element 532, such as a resistor, and a switching element 531, such as a transistor, are connected in series, and a discharge path from the positive electrode to the negative electrode of the third cell block 330 can be formed by an operation (on) of the switching element 531. The discharge element 532 may be inserted in either the source side or the drain side of the switching element 531, or may be connected to both sides. The fourth discharge unit 540 has a configuration in which a discharge element 542, such as a resistor, and a switching element 541, such as a transistor, are connected in series, and a discharge path from the positive electrode to the negative electrode of the fourth cell block 340 can be formed by an operation (on) of the switching element 541. The discharge element 542 may be inserted in either the source side or the drain side of the switching element 541, or may be connected to both sides.

In the voltage equalization circuit 500 according to the present embodiment, a wiring is shared for connection of the first discharge unit 510 to the negative electrode of the first cell block 310 and connection of the second discharge unit 520 to the positive electrode of the second cell block 320. In addition, a wiring is shared for connection of the second discharge unit 520 to the negative electrode of the second cell block 320 and connection of the third discharge unit 530 to the positive electrode of the third cell block 330. Moreover, a wiring is shared for connection of the third discharge unit 530 to the negative electrode of the third cell block 330 and connection of the fourth discharge unit 540 to the positive electrode of the fourth cell block 340. By partially sharing the wirings, the circuit cost of the voltage equalization circuit 500 is reduced.

Sharing some of the wirings described above is not essential for implementing the present disclosure, and even when a dedicated wiring is independently provided in each cell block, a useful effect of the present disclosure can be obtained.

The detection unit 550 detects a state of the second battery 30. The detection unit 550 includes a voltage sensor 551 that detects a voltage between the positive and negative electrodes of the first cell block 310, a voltage sensor 552 that detects a voltage between the positive and negative electrodes of the second cell block 320, a voltage sensor 553 that detects the voltage between the positive and negative electrodes and of the third cell block 330, and a voltage sensor 554 that detects the voltage between the positive and negative electrodes of the fourth cell block 340. The detection unit 550 functions as a voltage detection unit. Further, the detection unit 550 can function as a current detection unit that detects current of the second battery 30 using a current sensor (not shown), and as a temperature detection unit that detects the temperature of the second battery 30 using a temperature sensor (not shown).

The control unit 560 acquires each value detected by the detection unit 550, and based on each acquired value, executes a processing of equalizing the variations in the voltages (SOC) occurring between the respective cell blocks of the second battery 30 described above. In the voltage equalization processing, the control unit 560 discharges the cell block by operating a switching element of a discharge unit provided in a cell block of which the voltage is to be reduced (by applying an operation voltage to a gate of the transistor).

In addition, the control unit 560 acquires information on a power supply operation of the vehicle, determines that power has been at least turned off, and executes an abnormality sensing processing on the cell block to be described below. Examples of the information on the power supply operation of the vehicle may include information on turning on/off of an ignition switch. According to the result of the abnormality sensing processing on the cell block, the control unit 560 may notify a user of the vehicle of information corresponding to the result, using an information transmission unit (not shown), such as a display or a speaker. The control unit 560 may also notify a management center outside the vehicle, or the like, via a wireless communicator (not shown), such as a data communication module (DCM).

The control unit 560 is typically composed of an ECU including a processor, a memory, an input/output interface, and the like. The control unit 560 according to the present embodiment executes the voltage equalization processing and the abnormality sensing processing on the cell block when the processor reads and executes a program stored in the memory.

Control

Figure 4A:
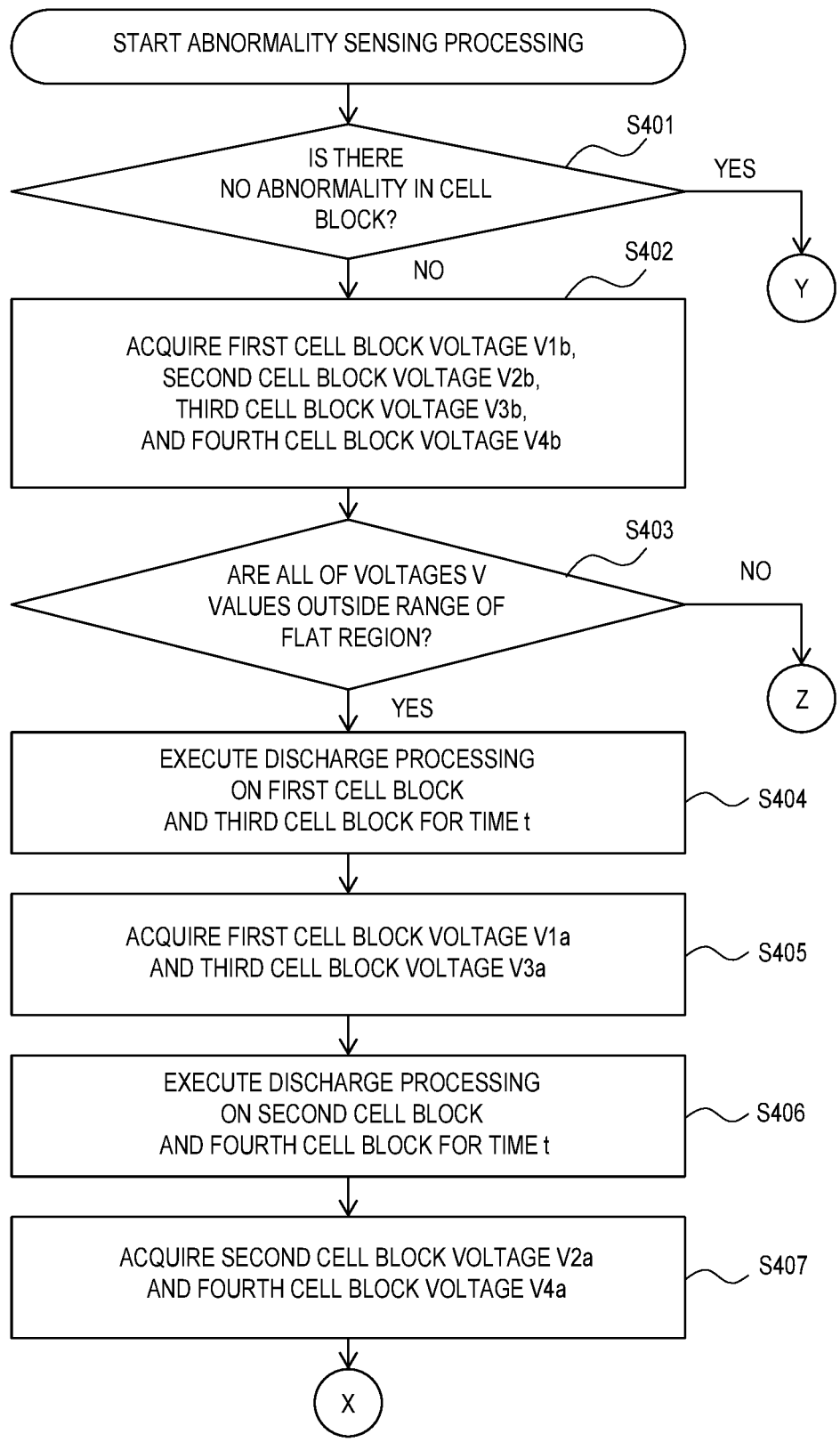
FIG. 4A is a flowchart of an abnormality sensing processing on a cell block of the second battery executed by the battery control device.
Figure 4B:
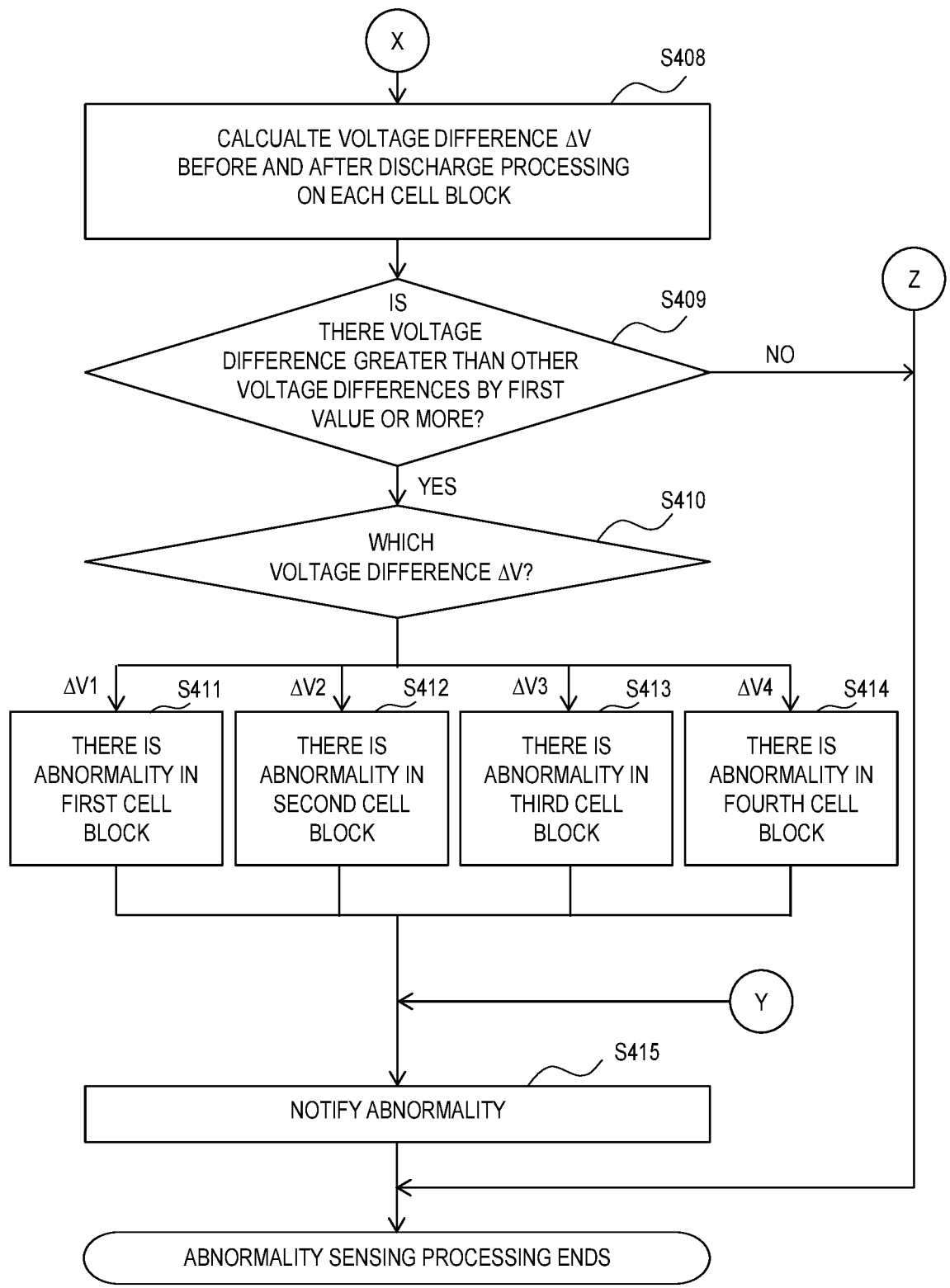
FIG. 4B is a flowchart of the abnormality sensing processing on the cell block of the second battery executed by the battery control device.

The control executed by the battery control device 50 according to the present embodiment will be described with further reference to FIGS. 4A and 4B. Each of FIGS. 4A and 4B is a flowchart illustrating procedures of an abnormality sensing processing on a cell block of the second battery 30, executed by the control unit 560 of the battery control device 50. The processing in FIG. 4A and the processing in FIG. 4B are connected at connectors X, Y, and Z, respectively.

The abnormality sensing processing on the cell block illustrated in FIGS. 4A and 4B is started at a timing at which operations of the in-vehicle devices 40 are not affected. In the present embodiment, the processing is started at the timing at which power of the vehicle is turned off when, for example, the ignition switch is switched from on to off.

Step S401: First, the control unit 560 of the battery control device 50 determines whether there is an abnormality in the first cell block 310, the second cell block 320, the third cell block 330, and the fourth cell block 340 that compose the second battery 30. The determination is made for the following reasons.

As described above, the abnormality sensing processing is executed every time power of the vehicle is turned off. For this reason, even when it is determined that there is an abnormality in the cell block in the abnormality sensing processing executed at a certain timing, there may be a case where a measure for eliminating the abnormality is not executed by the next timing when the abnormality sensing processing is executed. For example, when the vehicle cannot be left in a maintenance shop on a day when the abnormality is notified, the vehicle is used during that day, so it is assumed that power of the vehicle is switched on/off many times during the day. Further, the abnormality sensing processing is aimed at detecting an abnormality that has occurred in any one of the cell blocks, and it is not necessary to further detect abnormalities in two or more cell blocks. Therefore, once it is determined that there is an abnormality in the cell block, the determination in step S401 is executed to limit the execution of an unnecessary abnormality sensing processing until the abnormality is resolved.

When there is no abnormality in any of the cell blocks of the second battery 30 (No in step S401), the processing proceeds to step S402, and when there is an abnormality in any one of the cell blocks of the second battery 30 (Yes in step S401), the processing proceeds to step S415.

Step S402: The control unit 560 of the battery control device 50 acquires a voltage V1b between the positive and negative electrodes of the first cell block 310 of the second battery 30 from the voltage sensor 551 of the detection unit 550. Further, the control unit 560 acquires a voltage V2b between the positive and negative electrodes of the second cell block 320 of the second battery 30 from the voltage sensor 552 of the detection unit 550. Further, the control unit 560 acquires a voltage V3b between the positive and negative electrodes of the third cell block 330 of the second battery 30, which is not adjacent to the first cell block 310, from the voltage sensor 553 of the detection unit 550. Further, the control unit 560 acquires a voltage V4b between the positive and negative electrodes of the fourth cell block 340 of the second battery 30, which is not adjacent to the second cell block 320, from the voltage sensor 554 of the detection unit 550.

Step S403: The control unit 560 of the battery control device 50 determines whether all of the voltage V1b, the voltage V2b, the voltage V3b, and the voltage V4b of the cell blocks acquired from the detection unit 550 are values outside the range of the flat region in the SOC-OCV characteristic curve of the battery cells. When each voltage V is within the range of the flat region, a large change in voltage before and after the discharge processing to be described below cannot be expected, and sensing accuracy of the abnormality deteriorates. Thus, the above determination is made in order to avoid an unnecessary execution of the abnormality sensing processing. When the battery having no flat region in the SOC-OCV characteristic curve is used as the second battery 30, the determination in step S403 can be omitted.

When all of the voltages V of the cell blocks are values outside the range of the flat region (Yes in step S403), the processing proceeds to step S404, and when all of the voltages V of the cell blocks are not values outside the range of the flat region (No in step S403), the abnormality sensing processing ends.

Step S404: First, the control unit 560 of the battery control device 50 executes the discharge processing on the first cell block 310 and the third cell block 330 of the second battery 30 for time t (a first time). Specifically, the discharge processing on the first cell block 310 is executed by operating (turning on) the switching element 511 of the first discharge unit 510 of the voltage equalization circuit 500 for time t such that current flows from the respective battery cells 311, 312 of the first cell block 310 to the discharge element 512. The discharge processing on the third cell block 330 is executed by operating (turning on) the switching element 531 of the third discharge unit 530 of the voltage equalization circuit 500 for time t such that current flows from the respective battery cells 331, 332 of the third cell block 330 to the discharge element 532. Time t is appropriately set in consideration of the sensing accuracy required for the abnormality sensing processing and energy loss of the battery cells caused by forced discharge, such that a discharge amount is as small as possible.

Step S405: After the discharge processing on the first cell block 310 and the third cell block 330 is completed, the control unit 560 of the battery control device 50 acquires a voltage V1a between the positive and negative electrodes of the first cell block 310 of the second battery 30 from the voltage sensor 551 of the detection unit 550. The control unit 560 also acquires a voltage V3a between the positive and negative electrodes of the third cell block 330 of the second battery 30 from the voltage sensor 553 of the detection unit 550.

Step S406: Next, the control unit 560 of the battery control device 50 executes the discharge processing on the second cell block 320 and the fourth cell block 340 of the second battery 30 for time t. Time t is the same as the time for which the discharge processing is executed on the first cell block 310 and the third cell block 330 in step S404. Specifically, the discharge processing on the second cell block 320 is executed by operating (turning on) the switching element 521 of the second discharge unit 520 of the voltage equalization circuit 500 for time t such that current flows from the respective battery cells 321, 322 of the second cell block 320 to the discharge element 522. The discharge processing on the fourth cell block 340 is executed by operating (turning on) the switching element 541 of the fourth discharge unit 540 of the voltage equalization circuit 500 for time t such that current flows from the respective battery cells 341, 342 of the fourth cell block 340 to the discharge element 542.

Step S407: After the discharge processing on the second cell block 320 and the fourth cell block 340 is completed, the control unit 560 of the battery control device 50 acquires a voltage V2a between the positive and negative electrodes of the second cell block 320 of the second battery 30 from the voltage sensor 552 of the detection unit 550. The control unit 560 also acquires the voltage V4a between the positive and negative electrodes of the fourth cell block 340 of the second battery 30 from the voltage sensor 554 of the detection unit 550.

The processing of steps S404 to S407 is executed on a premise that the voltage equalization circuit 500 according to the present embodiment has a configuration in which a part of the wiring of the discharge unit is shared by the adjacent cell blocks of the second battery 30, as illustrated in FIG. 3. When the voltage equalization circuit 500 has such a configuration, the control unit 560 cannot concurrently execute the discharge processing on the two adjacent cell blocks. Therefore, in the present embodiment, for example, the cell blocks of the second battery 30 are divided into an odd-numbered group of the first cell block 310 and the third cell block 330 and an even-numbered group of the second cell block 320 and the fourth cell block 340, and the discharge processing is executed.

Any of the processing of steps S404 and S405 for discharging the odd-numbered group of the first cell block 310 and the third cell block 330 and the processing of steps S406 and S407 for discharging the even-numbered group of the second cell block 320 and the fourth cell block 340 may be executed first.

Further, when the voltage equalization circuit 500 has a configuration in which five or more cell blocks are connected in series, the discharge processing is executed separately for the odd-numbered cell block group and the even-numbered cell block group. Alternatively, the discharge processing may be executed by grouping according to a condition in which the two adjacent cell blocks are not grouped together. For example, the cell blocks may be divided into groups based on an equal difference or equal magnification of the cell block numbers.

Moreover, when the voltage equalization circuit 500 has a configuration in which an independent discharge unit dedicated to each cell block is used without sharing a part of the wiring of the discharge unit by the adjacent cell blocks, a plurality of adjacent cell blocks may be concurrently discharged or all of the cell blocks may be discharged at the same time. In addition, regardless of the configuration of the discharge unit of the voltage equalization circuit 500, each cell block may be independently discharged sequentially or randomly.

Step S408: After the discharge processing on all of the cell blocks is completed, the control unit 560 of the battery control device 50 respectively calculates, from the following equations, a voltage difference $\Delta V1$ before and after the discharge processing on the first cell block 310, a voltage difference $\Delta V2$ before and after the discharge processing on the second cell block 320, the voltage difference $\Delta V3$ before and after the discharge processing on the third cell block 330, and the voltage difference $\Delta V4$ before and after the discharge processing on the fourth cell block 340. The voltage difference $\Delta V$ is a positive value (the absolute value of the voltage difference) obtained by subtracting the voltage after the discharge processing from the voltage before the discharge processing:

Voltage difference $\Delta V1$=voltage $V1b$−voltage $V1a$

Voltage difference $\Delta V2$=voltage $V2b$−voltage $V2a$

Voltage difference $\Delta V3$=voltage $V3b$−voltage $V3a$

Voltage difference $\Delta V4$=voltage $V4b$−voltage $V4a$

Step S409: The control unit 560 of the battery control device 50 compares the plurality of calculated voltage differences ΔV, and determines whether there is a voltage difference ΔV greater than the other voltage differences ΔV by a first value or more. The first value is a predetermined reference value for determining whether there is an abnormality in a cell block, and is appropriately set such that whether there is an abnormality can be determined with high accuracy based on the number of battery cells connected in parallel that compose the cell block, a value of the discharge element (such as a resistance value) included in each discharge unit of the voltage equalization circuit 500, and time t of the discharge processing. When there is a voltage difference ΔV greater than the other voltage differences ΔV by the first value or more (Yes in step S409), the processing proceeds to step S410. On the other hand, when there is not a voltage difference ΔV greater than the other voltage differences ΔV by the first value or more (No in step S409), the abnormality sensing processing ends.

Step S410: The control unit 560 of the battery control device 50 determines which cell block has a voltage difference ΔV greater than the other voltage differences ΔV by the first value or more. When the voltage difference ΔV1 is greater than the other voltage differences ΔV2, ΔV3, and ΔV4 by the first value or more (ΔV1 in step S410), the processing proceeds to step S411. When the voltage difference ΔV2 is greater than the other voltage differences ΔV1, ΔV3, and ΔV4 by the first value or more (ΔV2 in step S410), the processing proceeds to step S412. When the voltage difference ΔV3 is greater than the other voltage differences ΔV1, ΔV2, and ΔV4 by the first value or more (ΔV3 in step S410), the processing proceeds to step S413. When the voltage difference ΔV4 is greater than the other voltage differences ΔV1, ΔV2, and ΔV3 by the first value or more (ΔV4 in step S410), the processing proceeds to step S414.

Figure 5:
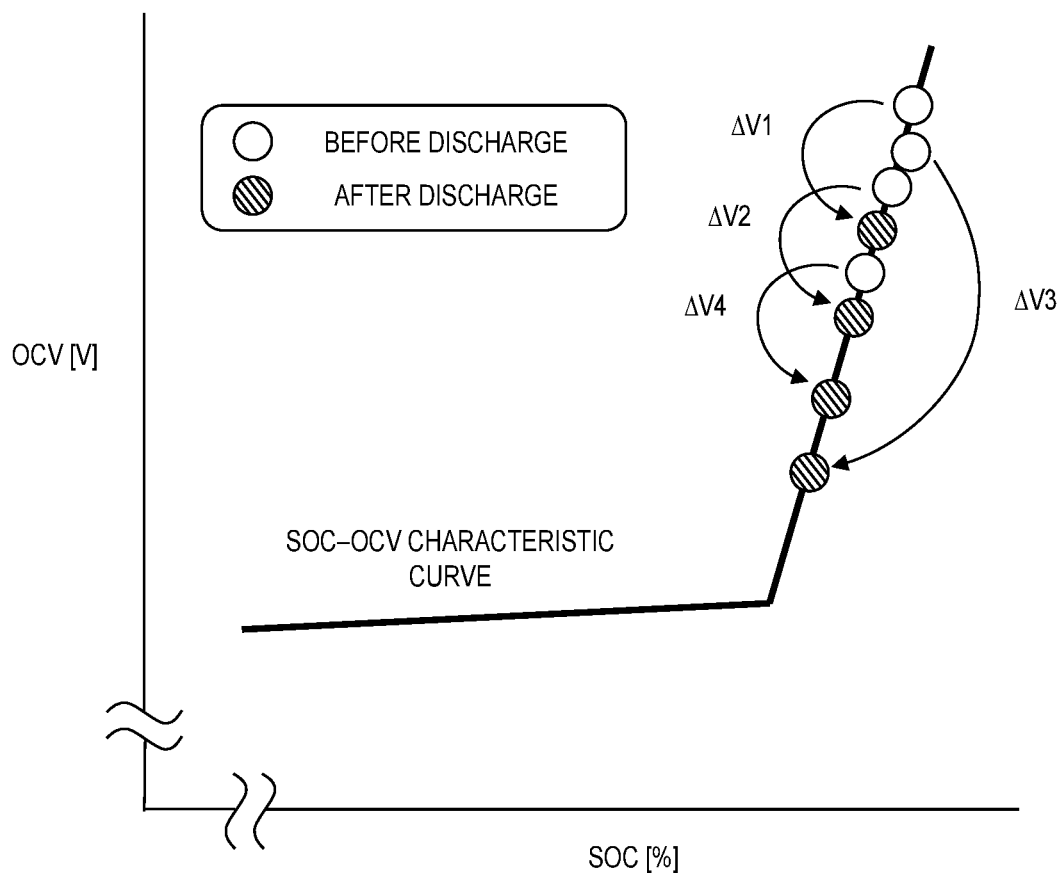
FIG. 5 is a diagram illustrating, as an image, a voltage change in each cell block before and after a discharge processing.

FIG. 5 is a diagram illustrating an image of a voltage change in each cell block before and after the discharge processing. FIG. 5 illustrates a case where the voltage difference ΔV3 of the third cell block 330 is approximately twice as great as the voltage difference ΔV1 of the first cell block 310, the voltage difference ΔV2 of the second cell block 320, and the voltage difference ΔV4 of the fourth cell block 340. In this case, for example, when the first value is set to a value similar to the voltage difference ΔV1, or the like, it is determined that the voltage difference ΔV3 of the third cell block 330 is greater than the other voltage differences. On the other hand, when the first value is set to a value three times as great as the voltage difference ΔV1, or the like, it is not determined that the voltage difference ΔV3 of the third cell block 330 is greater than the other voltage differences.

Step S411: The control unit 560 of the battery control device 50 determines that there is an abnormality in the first cell block 310 of the second battery 30. It is conceivable that an abnormality, such as disconnection in the parallel connection of the battery cells 311, 312 that compose the first cell block 310, has occurred.

Step S412: The control unit 560 of the battery control device 50 determines that there is an abnormality in the second cell block 320 of the second battery 30. It is conceivable that an abnormality, such as disconnection in the parallel connection of the battery cells 321, 322 that compose the second cell block 320, has occurred.

Step S413: The control unit 560 of the battery control device 50 determines that there is an abnormality in the third cell block 330 of the second battery 30. It is conceivable that an abnormality, such as disconnection in the parallel connection of the battery cells 331, 332 that compose the third cell block 330, has occurred.

Step S414: The control unit 560 of the battery control device 50 determines that there is an abnormality in the fourth cell block 340 of the second battery 30. It is conceivable that an abnormality, such as disconnection in the parallel connection of the battery cells 341, 342 that compose the fourth cell block 340, has occurred.

Step S415: The control unit 560 of the battery control device 50 notifies information indicating that there is an abnormality in the second battery 30 or in a specific cell block of the second battery 30 to the user of the vehicle, a management center outside the vehicle, or the like, via a predetermined information transmitter or wireless communicator. The notified information may include a message prompting inspection or repair of the vehicle at a designated maintenance shop, such as a vehicle dealer. When the notification of the abnormality is sent, the abnormality sensing processing ends.

The notification may be sent when the abnormality is determined, or may be sent the next time the power of the vehicle is turned on. Moreover, the notification may be displayed for a certain period of time and deleted, or may be displayed until an appropriate action, such as inspection and repair, is executed.

Advantageous Effect

As described above, with the battery control device and the abnormality sensing method according to the embodiment of the present disclosure, a predetermined discharge processing is executed using the voltage equalization circuit including the discharge unit connected between the positive and negative electrodes of each cell block of the battery (the second battery 30) to be controlled. Then, the battery control device determines whether there is an abnormality in the cell block based on the voltage difference of each cell block before and after the discharge processing.

As described above, since it is possible to determine whether there is an abnormality in the cell block using the voltage equalization circuit that is provided in advance in the battery to be controlled, an increase in the cost of a battery control device due to an addition of a cell block abnormality sensing function can be restricted.

Further, in the abnormality sensing method executed by the battery control device according to the present embodiment, since it is only necessary to acquire the voltage difference obtained by discharging for the time when the discharge amount is as small as possible, it is possible to determine whether there is an abnormality in the cell block with low energy loss.

In addition, in the abnormality sensing method executed by the battery control device according to the present embodiment, the voltage equalization circuit is controlled such that two adjacent cell blocks are not concurrently discharged. Therefore, even when the voltage equalization circuit provided in the battery to be controlled has a configuration in which a part of the wiring of the discharge unit is shared, the abnormality sensing processing on the cell block can be executed.

Moreover, in the battery control device according to the present embodiment, the abnormality sensing processing is executed when the voltage of the cell block of the battery to be controlled is outside the range of the flat region in the SOC-OCV characteristic curve. Therefore, even with an LFP battery having a flat region in the SOC-OCV characteristic curve, it is possible to determine with high accuracy whether there is an abnormality in the cell block.

Although the embodiment of the present disclosure has been described above, the present disclosure is not limited to a battery control device, and the abnormality sensing method executed by a battery control device including a processor and a memory. The present disclosure can be comprehended as, for example, a control program of the abnormality sensing method, a computer-readable non-transitory storage medium storing the control program, or a vehicle on which a battery control device is mounted.

The battery control device and the abnormality sensing method of the present disclosure can be used for controlling a battery including two or more cell blocks connected in series in which a plurality of battery cells is connected in parallel.

What is claimed is:

1. A battery control device that controls a battery, including two or more cell blocks connected in series in each of which a plurality of battery cells is connected in parallel, each battery cell having a region, in which an absolute value of a change rate of an open circuit voltage with respect to a state of charge is equal to or smaller than a first value, in a state-of-charge versus open-circuit-voltage characteristic curve, to execute equalization of a voltage of each of the cell blocks, the battery control device comprising:
    a detection unit configured to detect the voltage between a positive electrode and a negative electrode of each of the cell blocks;
    a voltage equalization circuit that includes, corresponding to the cell blocks, a plurality of discharge units in each of which at least one discharge element and a switching element are connected in series, the plurality of discharge units being connected between the positive electrodes and the negative electrodes of the cell blocks, respectively; and
    a control unit configured to:
        control the switching elements in the plurality of discharge units to equalize the voltage of each of the cell blocks;
        control the switching elements at a predetermined timing to execute discharge of each of the cell blocks for a predetermined constant first time; and
        determine, when the voltage of each of the cell blocks detected by the detection unit is a value outside a range of the region in which the absolute value of the change rate of the open circuit voltage with respect to the state of charge is equal to or smaller than the first value, whether there is an abnormality in the cell blocks based on a voltage difference of each of the cell blocks before and after the discharge.

2. The battery control device according to claim 1, wherein:
    a part of a wiring of the voltage equalization circuit is shared by two adjacent cell blocks; and
    the control unit is configured to sequentially control one or more of the switching elements not to concurrently discharge the two adjacent cell blocks.

3. The battery control device according to claim 1, wherein the control unit is configured to determine, when an absolute value of the voltage difference of one of the cell blocks is greater than absolute values of voltage differences of all the others of the cell blocks by a second value or more, that there is an abnormality in the one cell block.

4. The battery control device according to claim 1, wherein:
    the battery is mounted on a vehicle; and
    the predetermined timing is a timing when power of the vehicle is turned off.

5. The battery control device according to claim 4, wherein the battery is an auxiliary battery.

6. The battery control device according to claim 1, wherein the control unit is configured to determine whether there is an abnormality in the cell blocks when there is no abnormality in any of the cell blocks.

* * * * *